United States Patent [19]

Ederati et al.

[11] 4,101,147
[45] Jul. 18, 1978

[54] STEERING COLUMN ADJUSTMENT MEANS

[75] Inventors: Richard M. Ederati, Oswego; William J. Brown, Naperville, both of Ill.

[73] Assignee: Caterpillar Tractor Co., Peoria, Ill.

[21] Appl. No.: 814,595

[22] Filed: Jul. 11, 1977

[51] Int. Cl.² .............................................. B62D 1/18
[52] U.S. Cl. .................................... 280/775; 74/492; 280/779
[58] Field of Search ................... 180/775, 779, 780; 74/492, 493

[56] References Cited

U.S. PATENT DOCUMENTS

| 1,148,239 | 7/1915 | Lancia | 280/775 |
|---|---|---|---|
| 1,230,245 | 6/1917 | Walker | 280/779 |
| 1,623,493 | 4/1927 | Postlethwait | 280/775 |
| 3,003,363 | 10/1961 | DeHart | 74/493 |
| 3,533,302 | 10/1970 | Hansen | 280/775 X |
| 3,628,396 | 12/1971 | Grobowski | 280/775 X |

FOREIGN PATENT DOCUMENTS 777,659   6/1957   United Kingdom ................. 280/775

Primary Examiner—Joseph F. Peters, Jr.
Assistant Examiner—Terrance L. Siemens
Attorney, Agent, or Firm—Wegner, Stellman, McCord, Wiles & Wood

[57] ABSTRACT

A steering column structure permitting steered driving of a vehicle during the assembly thereof. The steering column structure includes a mounting plate which may be temporarily secured to the frame of the vehicle prior to the installation of the cab and final appointments thereof. The steering column is pivotally mounted to the mounting plate and a bracket is provided for holding the steering column in a preselected upright position in such temporary installation. The mounting plate is adapted to be subsequently secured to the floor structure of the cab when such is installed in the vehicle.

11 Claims, 2 Drawing Figures

STEERING COLUMN ADJUSTMENT MEANS

BACKGROUND OF THE INVENTION

1. Field of the Invention

This invention relates to steering column assemblies, and in particular to means for temporarily mounting a steering column assembly in a vehicle as during assembly of the vehicle to permit steered driving thereof during such assembly.

2. Description of the Prior Art

During the assembly of a vehicle, such as a tractor, the base portion of the vehicle may be fitted out so as to be capable of being driven prior to the installation of the cab and other final appointments. To facilitate final assembly of the vehicle, it is desirable to permit such driving of the vehicle by suitable temporary means.

The conventional tractor vehicle includes a steering column having not only the steering wheel but a number of controls for associated auxiliary apparatus of the vehicle. Such steering columns may be separately assembled and installed in the vehicle as a step in the manufacture thereof.

SUMMARY OF THE INVENTION

The present invention comprehends an improved steering column assembly which permits steered driving of the vehicle during the assembly of the vehicle.

More specifically, the invention comprehends means for temporarily mounting the steering column assembly to the vehicle frame during an intermediate portion of the vehicle assembly process.

The improved mounting means may include a mounting plate, means pivotally mounting the steering column to the mounting plate, means for temporarily securing the mounting plate to the vehicle frame, and bracket means removably secured to the mounting plate for holding the steering column in a preselected upright position for use by the operator in steered driving of the vehicle.

The mounting plate may be secured to the vehicle frame by a bolt means.

The bracket means may include a sector member fixedly secured to the steering column as by welding, and a support removably connected to the sector and mounting plate.

The steering column may be rigidly mounted to a pump housing portion of the assembly and the pump housing may be pivotally mounted to the mounting plate by suitable pivot means. In the illustrated embodiment, the pivot means includes a pair of coaxial trunnions carried by the steering column and pivot members carried by the mounting plate for pivotally mounting the trunnions. In the illustrated embodiment, the trunnions are carried by the pump housing.

The bracket means may comprise a pair of uprights carried by the mounting plate and a bifurcated member fixed to the steering column and removably connected to the uprights.

The steering column assembly may include auxiliary controls carried by the steering column and connecting means for connecting the controls as desired.

The mounting plate is adapted to be fitted to the cab assembly upon installation thereof, permitting the temporary bracket means to be removed and the steering column assembly permanently secured in the vehicle.

Thus, the steering column assembly of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figures 1, 2:
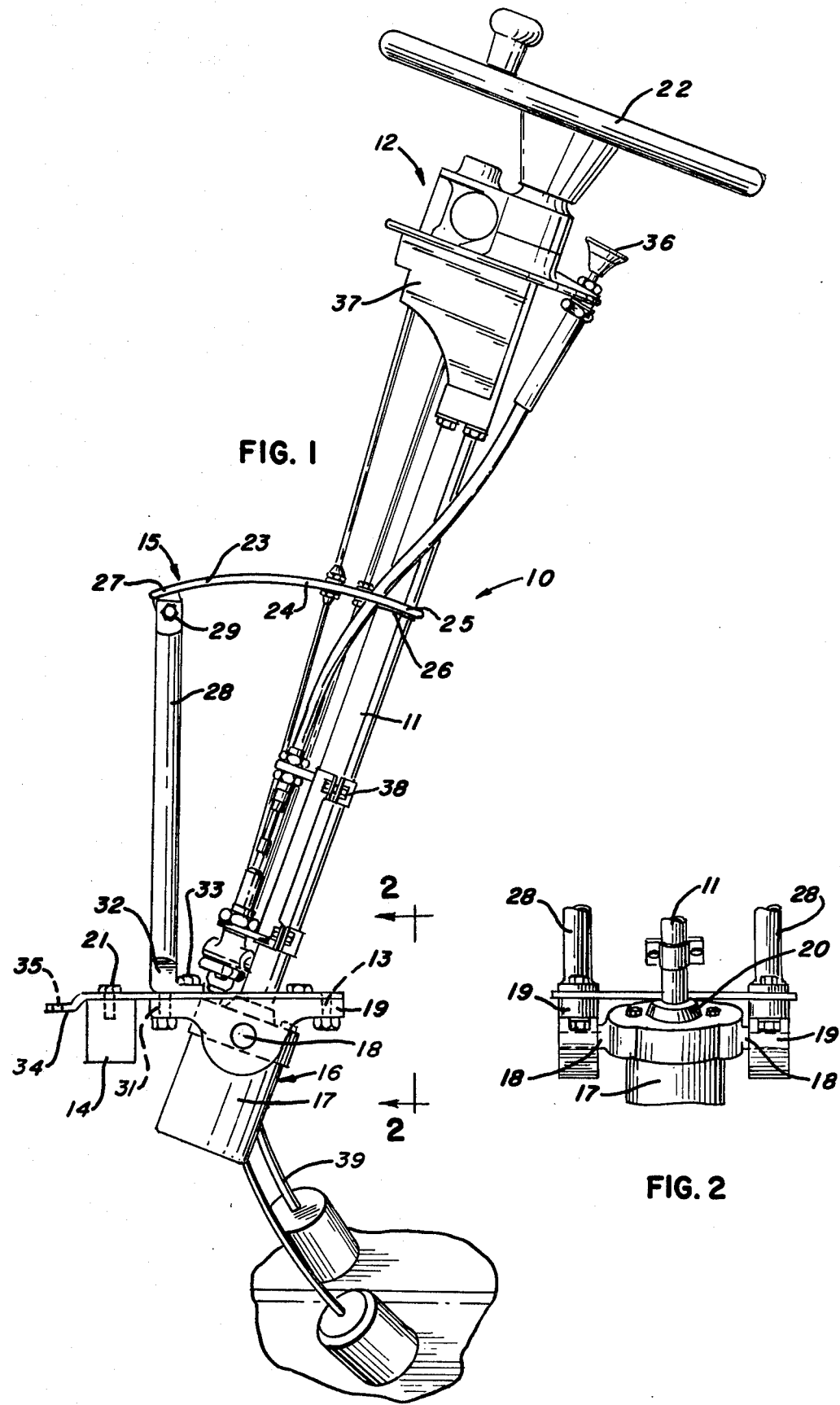
FIG. 1 is a fragmentary side elevation illustrating a steering column assembly embodying the invention.
FIG. 2 is a fragmentary rear elevation illustrating the pivotal mounting of the steering column to the mounting plate.

In the exemplary embodiment of the invention as disclosed in the drawing, a steering column assembly generally designated 10 is shown to include a steering column 11 and a plurality of auxiliary controls generally designated 12 carried by the steering column. The steering column and controls may comprise conventional means for use in a vehicle, such as a tractor. The present invention is concerned with the mounting of the steering column assembly such as for use in providing temporary steered driving of the vehicle during the assembly thereof, and more specifically, contemplates the use of a mounting plate 13 for temporarily mounting the steering column assembly to the frame 14 of the vehicle. Means generally designated 15 are further provided for holding the steering column in a preselected upwardly extending position during the temporary mounting thereof, as illustrated in FIG. 1.

More specifically, the steering column assembly 10 may include a pump 16 having an outer housing 17. The column 11 may be secured as by welding at its lower end to a mounting member 20 defining a pair of trunnions 18 pivotally mounted in a pair of pivot brackets 19 carried by the mounting plate 13. The trunnions are coaxially aligned to permit a pivoting of the steering column assembly about an axis parallel to the flat plane of the mounting plate 13. Mounting member 20 is fixedly secured to the pump housing 17 and, thus, the entire steering column assembly is pivotable about the axis of the trunnions relative to the mounting plate. As shown in FIG. 1, the mounting plate may be secured to the frame 14 by suitable removable means, such as bolts 21, to extend horizontally and, thus, the axis of the trunnions 18 extend horizontally so as to permit the pivoting of the steering column assembly to a desired inclined steering position wherein the wheel 22 of the assembly is disposed for suitable manipulation by the drive of the vehicle.

To hold the steering column assembly in the desired inclined upright disposition illustrated in FIG. 1, the holding means may removably connect the steering column to the mounting plate. More specifically, the holding means includes a sector member 23 having an arcuate portion 24 secured to the steering column 11 at an opening 25 therein by suitable means, such as welds 26.

The outer end portion 27 of the sector may be removably secured to an upright tubular support member 28 having flatted ends by suitable removable means, such as bolts 29. The lower flatted end 31 of support member 28 may be removably secured to the mounting plate 13 by bolts 33. Thus, support member 28 is removably fixedly secured in an upwardly extending disposition preselected to retain the steering column 11 in the desired angular disposition for steering use by the vehicle operator. The support 28 may be removed from the sector 23 and mounting plate 13 when the cab portion of the vehicle is installed so as to permit a permanent securing of the sector for retaining the steering column in the desired position in the completed vehicle. Such permanent securing means and cab constructions are well known to those skilled in the art and require no further illustration herein.

The mounting plate 13, as indicated briefly above, is adapted to be fitted to the floor portion of the cab construction and, thus, may be provided with a peripheral offset portion 34 provided with suitable bolt holes 35 for use in securing the mounting plate to the cab floor construction.

The auxiliary control 12 may comprise any desired controls of well known construction and, illustratively, may include a parking brake control 36, etc. The auxiliary controls are carried with the steering column 11 by suitable means, such as mounting brackets 37 and 38. The auxiliary controls may include connecting means, such as connecting means 39 for connecting the same to different portions of the vehicle as desired.

As the steering column assembly may be installed on the partially completed vehicle as a unit and suitably held in position for use by the readily removable bracket means 15, facilitated assembly of the vehicle is provided as the vehicle may be suitably driven during the assembly operation to different locations for facilitating the assembly processes. Upon subsequent installation of the superstructure of the vehicle, including the cab means thereof, the temporary bracket means may be removed permitting the sector 23 to be utilized in the conventional manner in permanently securing the steering column assembly in the desired steering position within the vehicle.

The foregoing disclosure of specific embodiments is illustrative of the broad inventive concepts comprehended by the invention.

The embodiments of the invention in which an exclusive property or privilege is claimed are defined as follows:

1. In a steering column assembly for use in steering a vehicle having a frame, improved means for temporarily mounting the steering column to the vehicle frame during assembly of the vehicle to permit steered driving of the vehicle during such assembly, said mounting means comprising:

a mounting plate;
means pivotally mounting the steering column to said mounting plate;
means for temporarily securing the mounting plate to the vehicle frame; and
bracket means removably secured to said mounting plate for holding the steering column in a preselected upwardly extending position.

2. The steering column assembly of claim 1 wherein said means for temporarily securing the mounting plate to the vehicle frame comprises bolt means.

3. The steering column assembly of claim 1 wherein said steering column is rigidly mounted to a mounting member pivotally mounted to said mounting plate.

4. The steering column assembly of claim 1 including a parking brake control attached to said steering column.

5. The steering column assembly of claim 1 wherein said bracket means includes a sector member fixedly secured to said steering column and a support removably connected to said sector and mounting plate.

6. The steering column assembly of claim 1 wherein said bracket means comprises means fixedly secured to said steering column and removably secured to said vehicle frame.

7. The steering column assembly of claim 1 wherein said means pivotally mounting the steering column to said mounting plate comprises a pair of coaxial trunnions carried by said steering column and pivot members carried by said mounting plate and pivotally mounting said trunnions.

8. The steering column assembly of claim 1 wherein said bracket means comprises a pair of uprights carried by said mounting plate and a bifurcated member fixed to said steering column and removably connected to said uprights.

9. The steering column assembly of claim 1 further including auxiliary controls carried by said steering column and connecting means for connecting said controls as desired.

10. The steering column assembly of claim 1 wherein said bracket means is welded to said steering column.

11. The steering column assembly of claim 1 wherein said steering column is rigidly mounted to a mounting member pivotally mounted to said mounting plate, said assembly further including a pump housing rigidly mounted to said mounting member.

* * * * *